United States Patent
Zhou et al.

(10) Patent No.: US 8,032,022 B2
(45) Date of Patent: Oct. 4, 2011

(54) METHOD FOR LIGHTPATH MONITORING IN AN OPTICAL ROUTING NETWORK

(75) Inventors: Xiang Zhou, Holmdel, NJ (US); Mark David Feuer, Colts Neck, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 865 days.

(21) Appl. No.: 12/012,902

(22) Filed: Feb. 6, 2008

(65) Prior Publication Data

US 2009/0196603 A1    Aug. 6, 2009

(51) Int. Cl.
*H04B 10/08* (2006.01)

(52) U.S. Cl. .............................. 398/32; 398/33; 398/65

(58) Field of Classification Search .............. 398/31–34, 398/65, 85
See application file for complete search history.

(56) References Cited

U.S. PATENT DOCUMENTS

| | | | | |
|---|---|---|---|---|
| 6,559,984 | B1 * | 5/2003 | Lee et al. | 398/5 |
| 2003/0128982 | A1 * | 7/2003 | Glingener | 398/65 |
| 2004/0016874 | A1 * | 1/2004 | Rao et al. | 250/225 |
| 2004/0156632 | A1 * | 8/2004 | Lee et al. | 398/26 |

* cited by examiner

*Primary Examiner* — Dzung Tran

(57) ABSTRACT

A method and system for enabling lightpath monitoring in an optical network is disclosed. A single polarization modulator/scrambler introduces a pilot tone signal as an overlay on a plurality of optical signals on a source node and a performance monitoring unit detects the pilot tone signal to enable light path monitoring and identification through the optical network.

12 Claims, 4 Drawing Sheets

FIG. 4

METHOD FOR LIGHTPATH MONITORING IN AN OPTICAL ROUTING NETWORK

FIELD OF THE INVENTION

The present invention relates generally to monitoring the status of an optical network, and more particularly, to a new method for lightpath monitoring by overlaying a characteristic polarization pilot tone frequency on an optical signal(s) and detecting the same in the electrical domain. This expedient provides a unique in-band lightpath label for lightpath tracing and identification in an optical-routing network.

BACKGROUND OF THE INVENTION

Optical networks using Remotely configurable Optical Add/Drop Multiplexers (ROADMs) or Photonic Cross Connects (PXCs) to optically route are commonly deployed in optical networks, and provide the benefits of lower cost, greater flexibility in data formats, and hitless capacity upgrades. In such networks, the signals may remain in the optical domain for thousands of km, passing through many optical amplifiers (OAs) and multiple ROADMs/PXCs (nodes). To operate such a network successfully on a large scale, a new suite of management tools that support dynamic wavelength routing is needed. Such tools should promote no-touch provisioning, adaptive fault tolerance, and intelligent performance monitoring with prediction of impending failures, while operating reliably in a challenging environment containing sparse Optical-Electrical-Optical (O-E-O) locations. To achieve this goal, many network parameters need to be monitored. One of the network parameters that needs to be monitored is referred to in the art as the "lightpath," which is defined as the path followed by a particular wavelength from its source node, through various ROADMs and PXCs, and ultimately to the terminating node. Conventional wavelength-based monitoring methods cannot guarantee proper wavelength routing as these cannot distinguish optical signals with identical wavelengths that emanate from different source nodes such as is shown in the illustrative wavelength routing network 100, in FIG. 1.

Referring now to FIG. 1, there is shown a plurality of nodes, A 102, B 104, C 106 and D 108, and a photonic crossconnect (PXC) 110 for wavelength routing. Four signals (collectively labeled 112) originating at node 102 and four signals (collectively labeled 114) originating at node 104 are transmitted to node 108 (signals now collectively labeled 118) and node 106 (signals now collectively labeled 116), respectively, through multiple optical amplifiers (OAs) 120.

To provide lightpath tracing capability, two different approaches have been proposed. The first is referred to as a "pilot tone technique." For this method, an overlay characteristic pilot tone frequency is introduced for each optical signal, and lightpath tracing is achieved by monitoring the pilot frequency through low-frequency electrical spectrum analysis without using a wavelength selector (i.e. the total optical power is detected). This method has the advantages of modulation-format transparency and simplicity (for amplitude-based pilot tone), but it also suffers serious drawbacks. For example, amplitude-modulation based pilot tone methods suffer from Stimulated Raman Scattering (SRS) crosstalk. Phase/frequency pilot tone and polarization pilot tones are inherently immune to first order SRS crosstalk. These expedients are much more expensive to implement than amplitude pilot tone techniques since each signal requires an independent phase/frequency or polarization modulator, and each corresponding receiver requires a phase/frequency or polarization discriminator.

Another known lightpath tracing technique is referred to as "digital lightpath labeling." This method introduces an overhead to encode the light label information, where the overhead varies the distribution of "1" and '0' bits. In this regard, the digital label can be received by detecting the total optical power with a low-speed photodetector. This method can be easily implemented using intensity-modulation based optical communications, but it has not been demonstrated in next generation phase-modulation based (such as Differential Phase-Shift Keying) optical communication systems. In addition, this method also suffers from deleterious SRS crosstalk.

In view of the foregoing, a need exists for a new method for monitoring lightpath and other important network parameters, specifically for phase-modulation based optical communication systems.

SUMMARY OF THE INVENTION

In accordance with a first aspect of the invention, there is disclosed a methodology of light path monitoring in an optical network. The method generally comprises the steps of: introducing a pilot tone signal from a single polarization modulator as an overlay on a plurality of optical signals from a source node; and detecting the pilot tone signal for light path monitoring and identification through the optical network.

In accordance with another aspect of the invention, there is disclosed a system for enabling light path monitoring in an optical network. The system generally comprises: a polarization modulator/scrambler for introducing a pilot tone signal as an overlay on a plurality of optical signals from a source node; and a performance monitoring unit for detecting the pilot tone signal to enable light path monitoring and identification through the optical network.

In accordance with yet another aspect of the invention, there is disclosed a system for simultaneous light path, channel power, polarization mode dispersion (PMD) and in-band optical signal-to-noise ratio (OSNR) monitoring in an optical network. The system generally comprises: a polarization modulator/scrambler for introducing a pilot tone signal as an overlay on a plurality of optical signals from a source node; and a performance monitoring unit for detecting the pilot tone signal to enable light path monitoring and identification through the optical network, as set forth above, but where the performance monitoring unit includes a first filter and a second filter coupled to the first filter, where each of the first and second filters have different passbands and are adapted to separate noise-induced signal depolarization and polarization mode dispersion (PMD) depolarization. A polarization beam splitter is interposed between the first and second filters, and at least one photodetector is employed for detecting signals from the PBS and at least one of the first and second filters. Coupled to the photodetectors is at least one module for monitoring polarization mode dispersion (PMD) and in-band optical signal-to-noise ratio (OSNR).

These and further aspects and advantages of the invention will become apparent to those skilled in the art as the present invention is described with particular reference to the accompanying drawings.

BRIEF DESCRIPTION OF THE DRAWINGS

FIG. 4 is a schematic illustration of a third embodiment of the invention.

DESCRIPTION OF THE INVENTION

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

This invention proposes a new modulation-format-transparent method and system for lightpath monitoring, which overlays a characteristic polarization pilot tone frequency on an optical signal(s) and detects the same in the electrical domain. In this regard, the pilot tone frequency is introduced by an overlay polarization modulator/scrambler, and detected using low-frequency electrical spectrum analysis, while the optical frequency (signal) is detected using a wavelength selector. The present method allows all the optical signals from the same source node to share one polarization modulator/scrambler, resulting in significant cost reductions compared to conventional pilot tone techniques that utilize an independent polarization modulator for each optical signal at every source node. By including a wavelength selector in the performance monitoring unit, simultaneous lightpath and channel power monitoring are enabled. Moreover, the inventive methodology is compatible with known Polarization-Mode Dispersion (PMD) and in-band Optical Signal-to-Noise Ratio (OSNR) monitoring methods, which required polarization modulation of all signals. Known methodologies are disclosed in, for example, L. S. Yan, et al, "Simultaneous monitoring of both optical signal-to-noise ratio and polarization-mode dispersion using polarization scrambling and polarization-beam splitting," J. Lightwave Technology, Vol. 23, pp. 3290-3294, 2005, the content of which is incorporated by reference herein. Using methods in accordance with various aspects of the invention, simultaneous lightpath, channel power, PMD and in-band OSNR monitoring can be achieved with a single performance monitoring unit.

Figure 1:
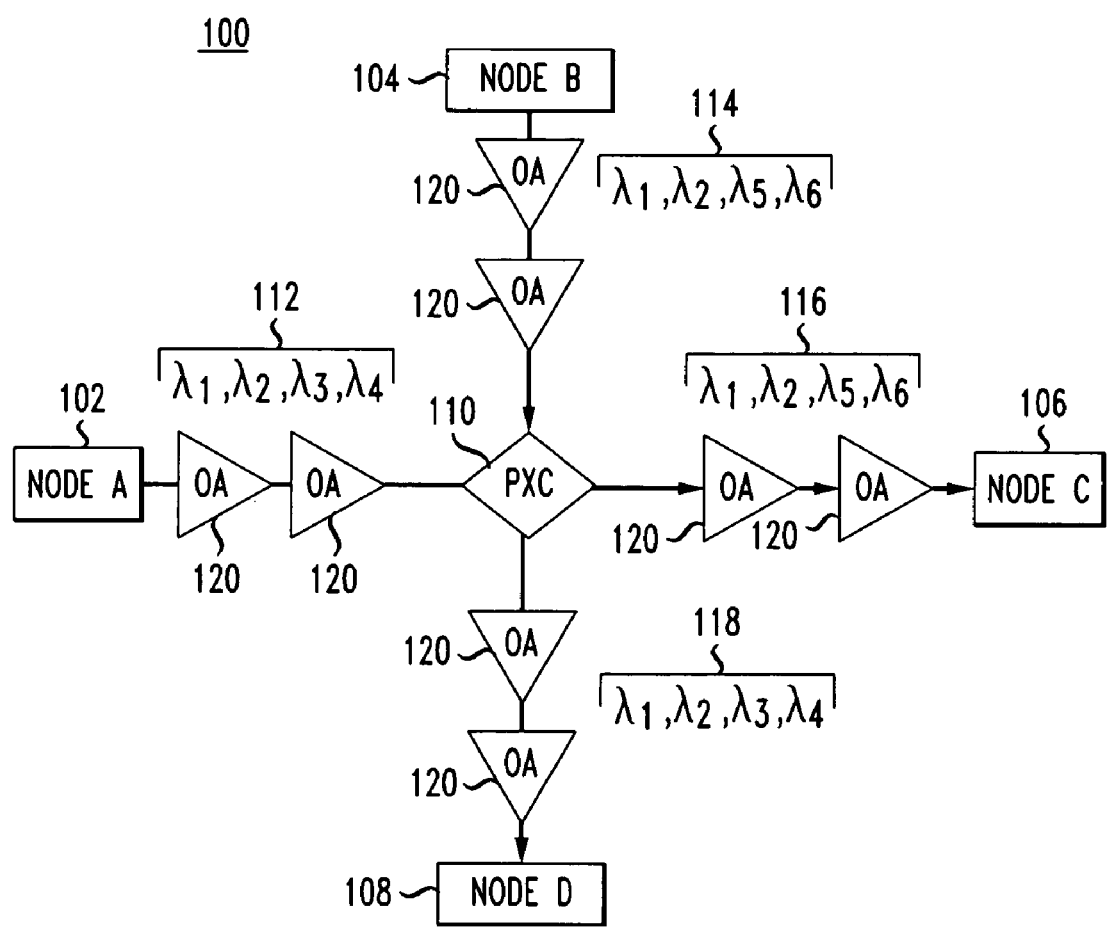
FIG. 1 is a schematic illustration of a wavelength-routing network.
Figure 2:
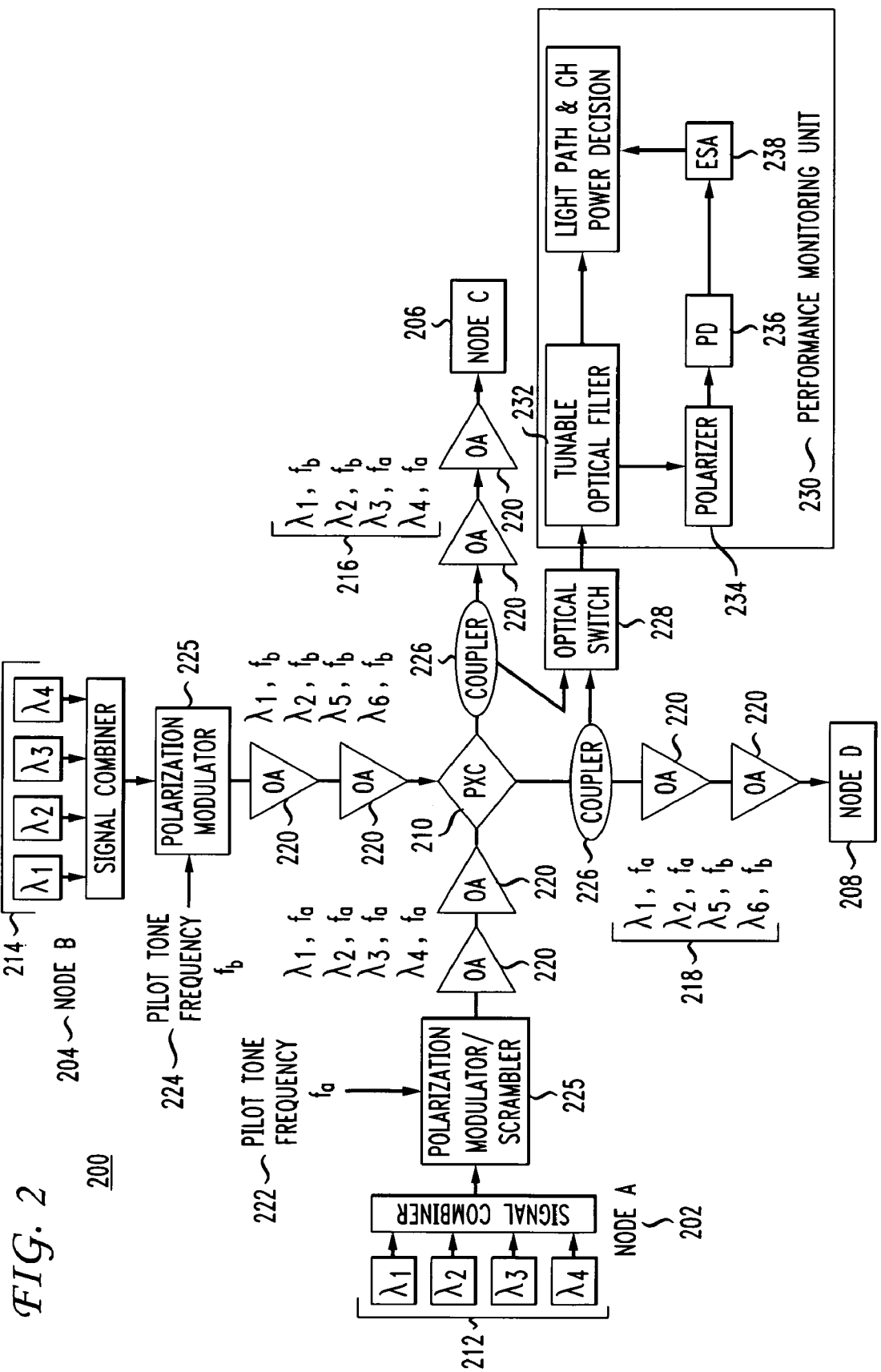
FIG. 2 is a schematic illustration of a first embodiment of the invention.

In FIG. 2 there is shown a schematic illustration of a first embodiment of the invention comprising an optical network 200, having four nodes (A 202, B 204, C 206, D 208) and a single optical cross-connect (PXC) 210 for wavelength routing. Four signals originating at node 202 (with wavelengths $\lambda_1$, $\lambda_2$, $\lambda_3$, $\lambda_4$, collectively labeled 212) and four signals originating at node 204 (with wavelengths $\lambda_1$, $\lambda_2$, $\lambda_5$, $\lambda_6$ collectively labeled 214) are transmitted via PXC 210 to node 208 and node 206. Note signals in the opposite direction (i.e. from nodes 206 and 208 to nodes 202 and 204) are not shown in this figure. Multiple optical amplifiers (OAs) 220 are used to boost signal power as is well known. As further depicted in FIG. 2, lightpath and channel power monitoring is implemented at each of the output ports of PXC 210 to ensure correct wavelength routing and also to provide feedback signals for a channel power equalizer, which is typically disposed inside each of the PXCs/ROADMs in the photonic network. For this embodiment, two signals at nodes 202 and 204 have identical wavelengths ($\lambda_1$ and $\lambda_2$) and cannot be distinguished by wavelength monitoring after the PXC 210. In order to monitor the lightpath, a pilot tone frequency for all optical signals from any given node is introduced through an overlay polarization modulator 225. The combination of the optical signals and the characteristic pilot tone frequency is thus used as a unique in-band lightpath label.

As specifically illustrated in FIG. 2, a characteristic pilot tone frequency $f_a$ 222 is introduced to all the optical signals from node 202, and a different pilot tone frequency $f_b$ 224 is introduced to all the optical signals from node 204. For this embodiment, an optical coupler 226 is used to tap the pilot tone signal from the optical path between the PXC 210 and a respective node and to deliver the pilot tone ($f_a$ 222 or $f_b$ 224) to an optical switch 228. The signal is then communicated to the performance monitoring unit 230, which comprises a tunable optical filter 232, polarizer 234, photodetector (PD) 236 and an electrical-spectrum analyzer (ESA) 238. The polarizer 234 converts polarization modulated signals into intensity modulated signals. The signal power passing through the polarizer 234 is proportional to $\cos^2(\theta/2)$, where $\theta$ is the angle between the Stokes vector of the signal and the polarization axis of the polarizer. For a case where the state of polarizations (SOPs) of the optical signals are modulated in such a way that the SOPs (expressed in Stokes space) of the considered optical signal uniformly cover the Poincare sphere (i.e. conventional polarization scrambling) within one modulation period, the total power of the filtered optical signal will pass through the polarizer at least once over one polarization-modulation period if PMD-induced signal depolarization is small. As a result, both the optical frequency and channel power can be determined by measuring a function of the filtered optical power after the polarizer versus the center wavelength of the filter, and the pilot tone frequency can be extracted by doing low-frequency electrical spectrum analysis of the photo-detected optical signal after the polarizer. As long as the SOPs are modulated so as to uniformly cover the Poincare sphere, the system of FIG. 2 can also be used to measure the OSNR of each wavelength channel. At two specific SOPs, the signal power passing through the polarizer will vanish, and the noise power can be measured. Thus, by comparing the maximum reading, which represents a sum of signal and noise power components, to the minimum reading, which represents noise power alone, OSNR can be calculated, as long as signal depolarization (e.g., due to PMD) remains small. In accordance with an aspect of the invention, one polarization modulator/scrambler is employed at each of the source nodes. A single performance monitoring unit 230 is shared by multiple ports of the PXC 210, or can even be shared by multiple co-located PXCs 210 through an optical switch 228. Since such PXCs 210 typically have multiple output ports (four or more for a bidirectional transport system), this expedient can provide significant cost savings for such optical transport systems. For intensity-modulated payload formats, the pilot tone must be set to a frequency where the data modulation has no spectral components. If other constraints make this impractical, alternative embodiments, such as those depicted in FIG. 3 or 4 can be used to compensate for the residual frequency components of the data modulation.

Referring again to the embodiment shown in FIG. 2, channel power is estimated by measuring the maximum power of the filtered optical signal after the polarizer 234. The estimate is sufficient if the SOPs of the polarization-modulated signal uniformly cover the Poincare sphere within one modulation period, and PMD-induced signal depolarization is small. However, when the SOPs of the polarization-modulated signal only cover part of the Poincare sphere in order to reduce clock jitter for some jitter-sensitive modulation formats in a high PMD link, the technique shown in the first embodiment (FIG. 2) may lose per channel power monitoring capability, although still be capable of lightpath monitoring. The embodiment depicted in FIG. 3 addresses this issue.

Figure 3:
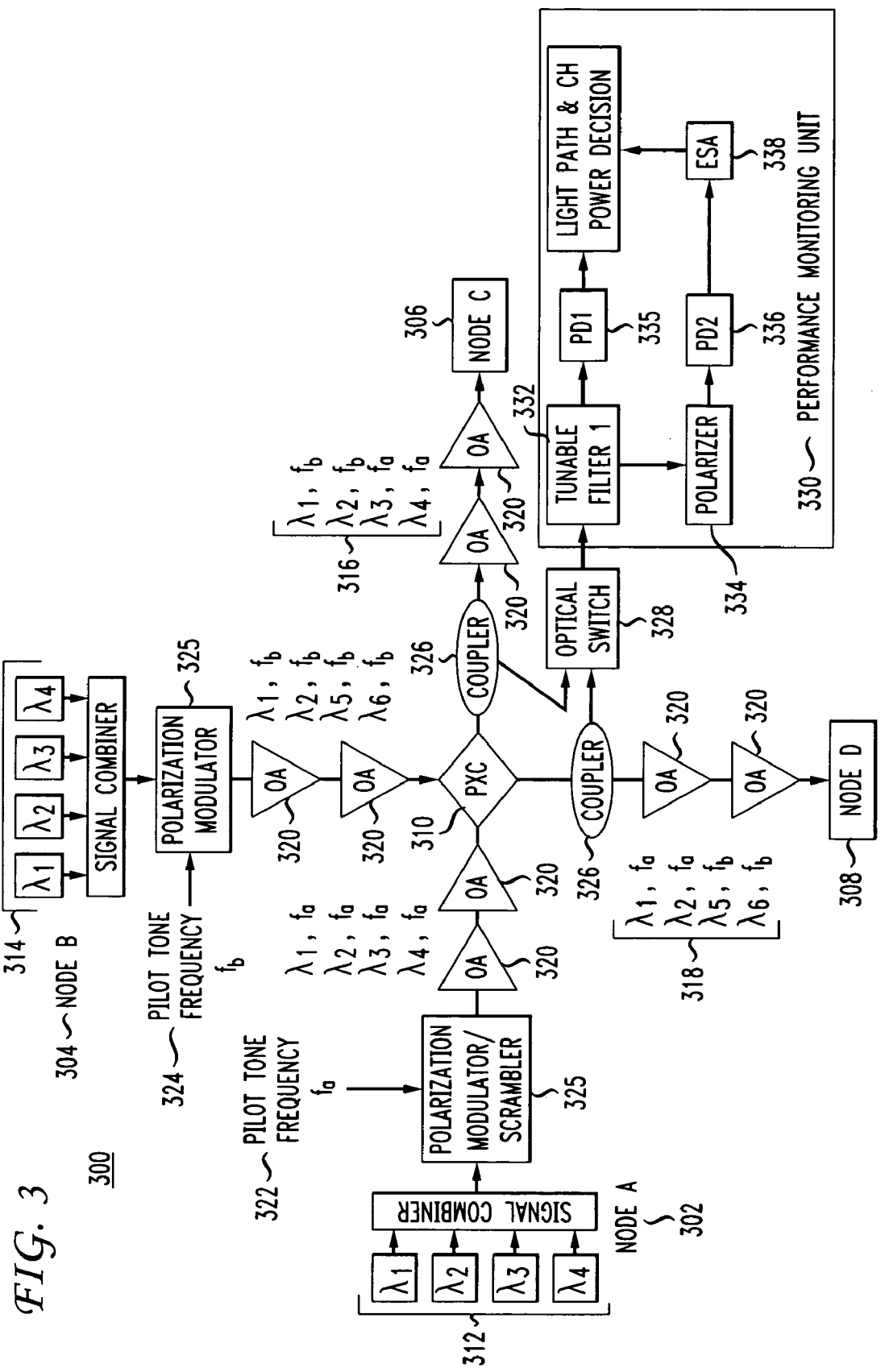
FIG. 3 is a schematic illustration of a second embodiment of the invention.

The expedient 300 illustrated in FIG. 3 is similar to that shown in FIG. 2 (with the same numbering conventions), however a second photodetector PD1 335 is utilized in the performance monitoring unit 330 in addition to PD2 336. PD1 335 detects the power of the filtered optical signals before the polarizer 334, while PD2 336 detects the power of the filtered optical signal after the polarizer 334. In accordance with this embodiment, channel power is directly monitored after the signal is passed through the tunable filter 332 and detected by PD1 335, and the polarization pilot tone frequency is extracted by low-frequency electrical-spectrum analysis (ESA) 338 of the detected signal PD2 336. As a result, the measurement accuracy of channel power is not impacted by polarization modulation effects imposed on the considered optical signal.

Figure 4:
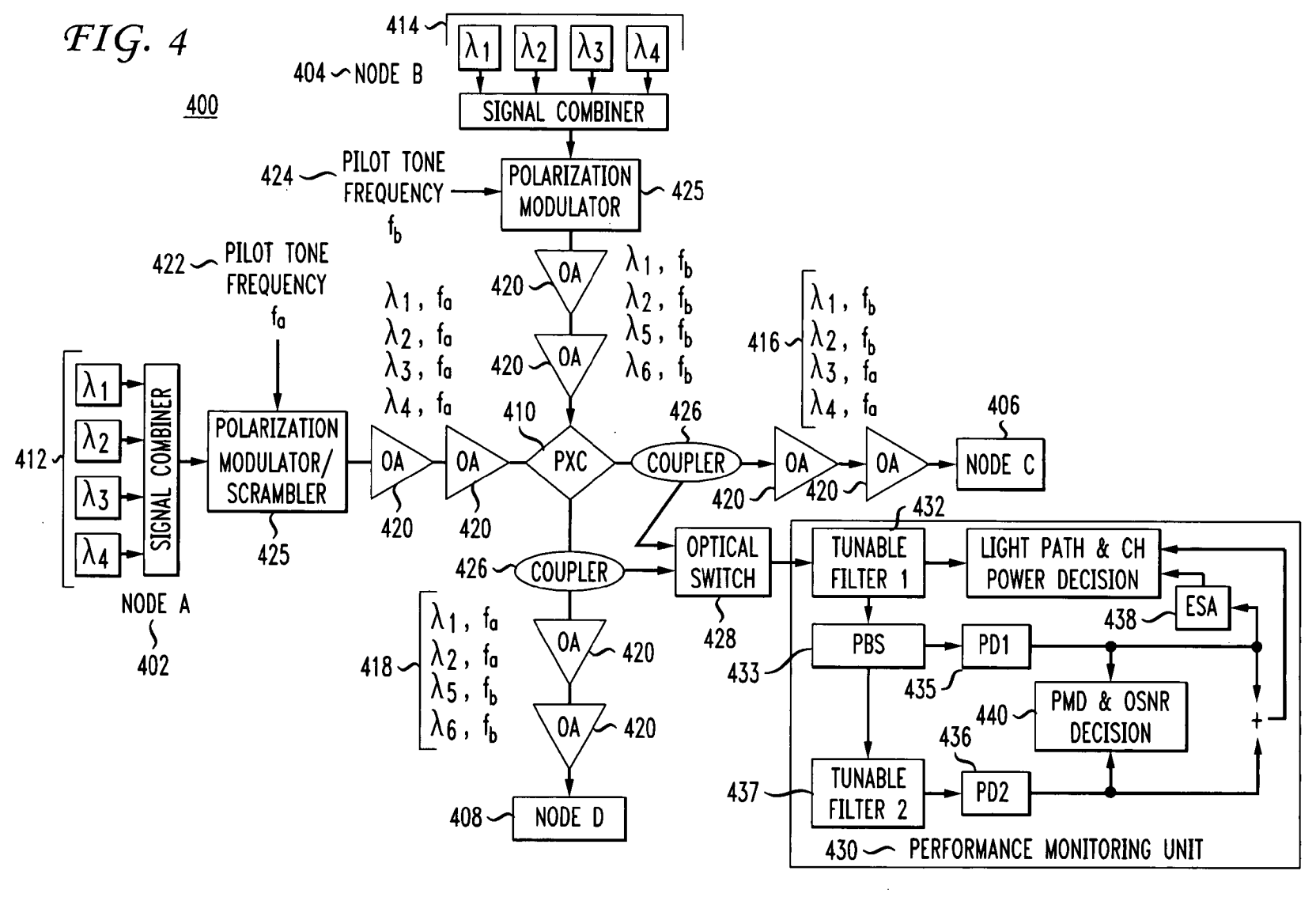

The expedient 400 illustrated in FIG. 4 is also similar to that shown in FIGS. 2 and 3 (with similar numbering conventions). As shown in FIG. 4, the performance monitoring unit 430 comprises a pair of tunable filters 432, 437 with different passbands, a pair of photodetectors PD1 435, PD2 436, a polarization beam splitter (PBS) 433, and an electrical-spectrum analyzer (ESA) 438. The tunable filters 432, 437 are operable to separate noise-induced 'signal' (original signal plus noise) depolarization and PMD-induced signal depolarization to enable simultaneous PMD and OSNR monitoring 440. A detailed algorithm for implementing this methodology is known in the art as evidenced by L. S. Yan, et al, where polarization scrambling is introduced at the receiver, instead of at the source node. This arrangement provides for simultaneous lightpath, channel power, PMD and in-band OSNR monitoring. The PBS 433 separates the signals to enable PMD and OSNR monitoring, and serves to convert polarization modulation to intensity modulation for pilot tone frequency extraction using ESA 438. The optical frequency of the considered signal is obtained by measuring the function of the sum of the detected powers through PD1 435 and PD2 436 versus the center wavelength (i.e., passband) of the filters 432, 437. Channel power monitoring is also based on the sum of the detected powers through PD1 435 and PD2 436. Additionally, the sum of the detected powers through PD1 435 and PD2 435 is proportional to the channel power, independent of the SOP of the considered signal.

In summary, the present invention uses the combination of optical frequency and a characteristic overlay polarization pilot tone frequency as a unique in-band lightpath label for lightpath tracing and identification in an optical-routing network. This system advantageously provides modulation-format transparency and simultaneous lightpath and per channel power monitoring capability, without suffering from SRS crosstalk. Moreover, it enables simultaneous PMD and in-band OSNR monitoring.

The foregoing detailed description is to be understood as being in every respect illustrative and exemplary, but not restrictive, and the scope of the invention disclosed herein is not to be determined from the description of the invention, but rather from the claims as interpreted according to the full breadth permitted by the patent laws. It is to be understood that various modifications will be implemented by those skilled in the art, without departing from the scope and spirit of the invention.

We claim:

1. A system for enabling light path monitoring in an optical network, comprising:
   a polarization modulator/scrambler for introducing a pilot tone signal as an overlay on a plurality of optical signals from a source node;
   a performance monitoring unit for detecting the pilot tone signal to enable light path monitoring and identification through the optical network;
   an optical coupler for tapping the pilot tone signal from the optical network; and
   an optical switch for receiving multiple pilot tone signals from different branches of the optical network,
   wherein the performance monitoring unit further comprises an optical filter coupled to the optical switch, a polarizer coupled to the optical filter, and a photodetector coupled to the polarizer.

2. The system recited in claim 1, wherein an optical frequency and channel power is estimated by measuring a function of filtered optical power after the polarizer with respect to a center wavelength of the optical filter.

3. The system recited in claim 2, wherein an optical signal-to-noise ratio is estimated by measuring a function of filtered optical power after the polarizer with respect to a center wavelength of the optical fiber.

4. The system recited in claim 2, wherein the pilot tone signal has a frequency that can be extracted via electrical spectrum analysis of the detected optical signal.

5. A system for enabling light path monitoring in an optical network, comprising:
   a polarization modulator/scrambler for introducing a pilot tone signal as an overlay on a plurality of optical signals from a source node; and
   a performance monitoring unit for detecting the pilot tone signal to enable light path monitoring and identification through the optical network,
   wherein the performance monitoring unit further comprises a plurality of photodetectors, a first of which is constructed and arranged so as to detect a power of a filtered optical signal before polarization thereof, and a second of which is constructed and arranged to detect a power of the filtered optical signal after polarization thereof.

6. The system recited in claim 5, wherein channel power can be directly monitored through a tunable filter and the first photodetector, and the pilot tone frequency can be extracted via low-frequency electrical spectrum analysis of the filtered optical signal at the second photodetector.

7. A system for enabling light path monitoring in an optical network, comprising:
   a polarization modulator/scrambler for introducing a pilot tone signal as an overlay on a plurality of optical signals from a source node; and
   a performance monitoring unit for detecting the pilot tone signal to enable light path monitoring and identification through the optical network,
   wherein the performance monitoring unit comprises:
      a first filter coupled to an optical switch;
      a second filter coupled to the first filter, each of the first and second filters having different passbands and adapted to separate noise-induced signal depolarization and polarization mode dispersion (PMD) depolarization.

8. The system of claim 7, further comprising a polarization beam splitter interposed between the first and second filters.

9. The system recited in claim 8, wherein the filters are tunable.

10. The system recited in claim 8, further comprising a module for monitoring polarization mode dispersion.

11. The system recited in claim 8, further comprising a module for monitoring in-band optical signal-to-noise ratio (OSNR).

12. A system for simultaneous light path, channel power, polarization mode dispersion (PMD) and in-band optical signal-to-noise ratio monitoring in an optical network, comprising:

a polarization modulator/scrambler for introducing a pilot tone signal as an overlay on a plurality of optical signals from a source node; and a performance monitoring unit for detecting the pilot tone signal to enable light path monitoring and identification through the optical network, the performance monitoring unit comprising:

a first filter coupled to an optical switch;

a second filter coupled to the first filter, each of the first and second filters having different passbands and adapted to separate noise-induced signal depolarization and polarization mode dispersion (PMD) depolarization;

a polarization beam splitter (PBS) interposed between the first and second filters;

at least one photodetector for detecting signals from the PBS and at least one of the first and second filters; and at least one module for monitoring polarization mode dispersion (PMD) and in-band optical signal-to-noise ratio (OSNR).

* * * * *